(12) United States Patent
Nagata et al.

(10) Patent No.: US 10,090,748 B2
(45) Date of Patent: Oct. 2, 2018

(54) LINEAR MOTOR AND COMPRESSOR EQUIPPED WITH LINEAR MOTOR

(71) Applicant: Hitachi, Ltd., Tokyo (JP)

(72) Inventors: Shuhei Nagata, Tokyo (JP); Masaki Koyama, Tokyo (JP); Takahiro Suzuki, Tokyo (JP); Yasuaki Aoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 14/936,997

(22) Filed: Nov. 10, 2015

(65) Prior Publication Data

US 2016/0149477 A1 May 26, 2016

(30) Foreign Application Priority Data

Nov. 25, 2014 (JP) .................. 2014-237270

(51) Int. Cl.
*H02K 41/03* (2006.01)
*F04B 39/12* (2006.01)
*F04B 35/04* (2006.01)
*H02K 1/14* (2006.01)

(52) U.S. Cl.
CPC ......... *H02K 41/031* (2013.01); *F04B 35/045* (2013.01); *F04B 39/122* (2013.01); *H02K 1/14* (2013.01)

(58) Field of Classification Search
CPC .... F04B 17/044; F04B 23/021; F04B 35/045; F04B 39/122; H02K 1/12; H02K 1/14; H02K 33/06; H02K 33/18; H02K 41/00; H02K 41/02; H02K 41/031
See application file for complete search history.

(56) References Cited

U.S. PATENT DOCUMENTS

| 3,947,155 A | * | 3/1976 | Bidol | F04B 35/045 |
| | | | | 310/17 |
| 3,999,107 A | * | 12/1976 | Reuting | G06M 1/107 |
| | | | | 310/12.04 |
| 4,198,743 A | * | 4/1980 | Stuber | F04B 35/045 |
| | | | | 29/596 |
| 5,349,256 A | * | 9/1994 | Holliday | F02G 1/0435 |
| | | | | 310/12.21 |

(Continued)

FOREIGN PATENT DOCUMENTS

| JP | 49-100513 A | 9/1974 |
| JP | 4-289746 A | 10/1992 |

(Continued)

OTHER PUBLICATIONS

Japanese Office Action received in corresponding Japanese Application No. 2014-237270 dated Oct. 24, 2017.

*Primary Examiner* — Patrick Hamo
*Assistant Examiner* — Joseph Herrmann
(74) *Attorney, Agent, or Firm* — Mattingly & Malur, PC (57) ABSTRACT

A linear motor includes an armature with two magnetic poles arranged in the Z direction, and winding wires wound around the two magnetic poles, respectively, and a mover with a permanent magnet, which moves relative to the armature in the Z direction. A first auxiliary magnetic pole is disposed between the two magnetic poles, and a bridge is disposed between the first auxiliary magnetic pole and the magnetic pole. The two winding wires are electrically coupled.

11 Claims, 10 Drawing Sheets

(56) References Cited

U.S. PATENT DOCUMENTS

| | | | | |
|---|---|---|---|---|
| 5,597,294 A | * | 1/1997 | McGrath | F04B 35/04 |
| | | | | 417/417 |
| 6,138,459 A | * | 10/2000 | Yatsuzuka | F04B 35/045 |
| | | | | 62/6 |
| 6,323,568 B1 | * | 11/2001 | Zabar | F04B 17/042 |
| | | | | 310/12.24 |
| 6,533,560 B2 | * | 3/2003 | Ohya | F04B 35/045 |
| | | | | 417/312 |
| 7,382,067 B2 | * | 6/2008 | Nakagawa | H01F 7/1615 |
| | | | | 310/15 |
| 8,466,587 B2 | * | 6/2013 | Aoyama | H02K 41/031 |
| | | | | 310/12.24 |
| 8,723,376 B2 | * | 5/2014 | Kawakami | H02K 41/02 |
| | | | | 310/12.24 |
| 2005/0173991 A1 | | 8/2005 | Watarai et al. | |

FOREIGN PATENT DOCUMENTS

| | | |
|---|---|---|
| JP | 2003-227465 A | 8/2003 |
| JP | 2005-287185 A | 10/2005 |
| JP | 2007-49817 A | 2/2007 |
| WO | 2004/093301 A1 | 10/2004 |

* cited by examiner

PRIOR ART

ND COMPRESSOR
LINEAR MOTOR AND COMPRESSOR EQUIPPED WITH LINEAR MOTOR

BACKGROUND

The present invention relates to a linear motor, and a compressor equipped with the linear motor.

The linear motor known to be relevant to the invention is disclosed in WO2004/093301.

Specifically, WO2004/093301 discloses an armature 3a constituted by teeth formed by punching the magnetic steel plate into a serrated shape, and an armature core for forming a yoke, and armature winding wires 5u, 5v, 5w formed by winding coils around a plurality of teeth 4u, 4v, 4w of the armature core, respectively. Teeth 6a wound with no coil are disposed between the teeth 4u and 4v, and teeth 4v and 4w, which are wound with coils, respectively. The teeth 4u, 4v, 4w wound with coils and the teeth 6a wound with no coil are arranged alternately (abstract). This makes it possible to improve interphase insulation (page 5, lines 1 to 6).

SUMMARY

According to the above-described structure, the currents flowing through the coils wound around the three teeth 4u, 4v, and 4w have different phases (U-phase, V-phase, W-phase). As there is the time period at which voltage values of the adjacent coils are significantly different, contact between those coils may cause the risk of short-circuit. Provision of the teeth 6a wound with no coil for the purpose of suppressing short-circuit, that is, improving the interphase insulation will narrow the space for accommodating the coil, resulting in difficulty in downsizing of the motor.

The present invention provides a linear motor which includes an armature with two magnetic poles arranged in a Z direction, and winding wires wound around the two magnetic poles, respectively, and a mover with a permanent magnet, which moves relative to the armature in the Z direction. A first auxiliary magnetic pole is disposed between the two magnetic poles, and a bridge is disposed between the first auxiliary magnetic pole and the magnetic pole. The two winding wires are electrically coupled.

The present invention is capable of providing the compact linear motor with improved controllability, and a compressor equipped with the linear motor. Any other structures, tasks and advantages of the present invention will be clarified by the following explanations of the embodiments for carrying out the invention.

DETAILED DESCRIPTION

Embodiments of the present invention will be described referring to the drawings. The same components will be designated with the same signs, and explanations thereof, thus will be omitted. For convenience of explanation, directions of X, Y and Z are orthogonal to one another. However, the gravity direction may be in parallel with any one of the X, Y and Z directions, or any other direction.

The respective components of the present invention are not necessarily independent from one another, which may be configured that a single component is constituted by a plurality of members, the single member is used for constituting a plurality of components, a certain component is a part of another component, the certain component is partially overlapped with another component, and the like.

First Embodiment

<Mover and Permanent Magnet 3a>

Figure 1:
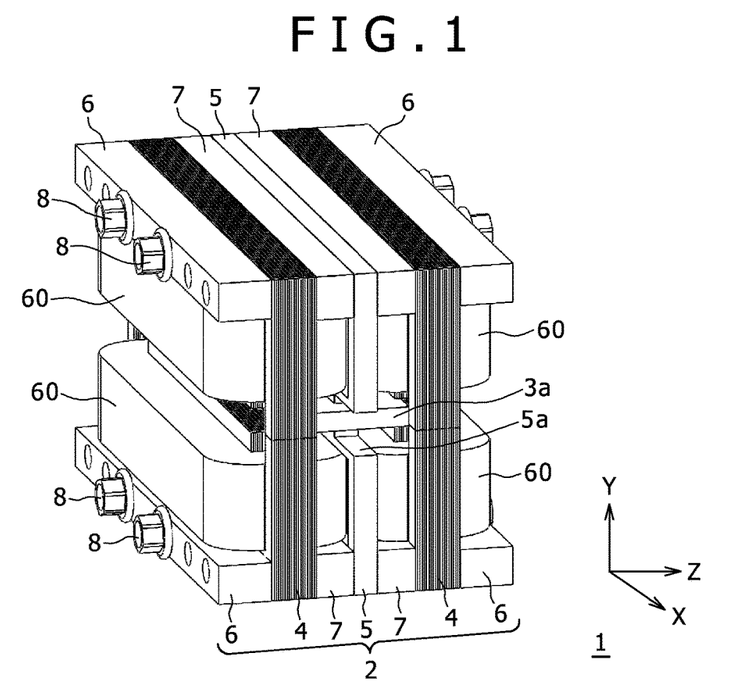
FIG. 1 is a perspective view of a linear motor according to a first embodiment.
Figure 2:
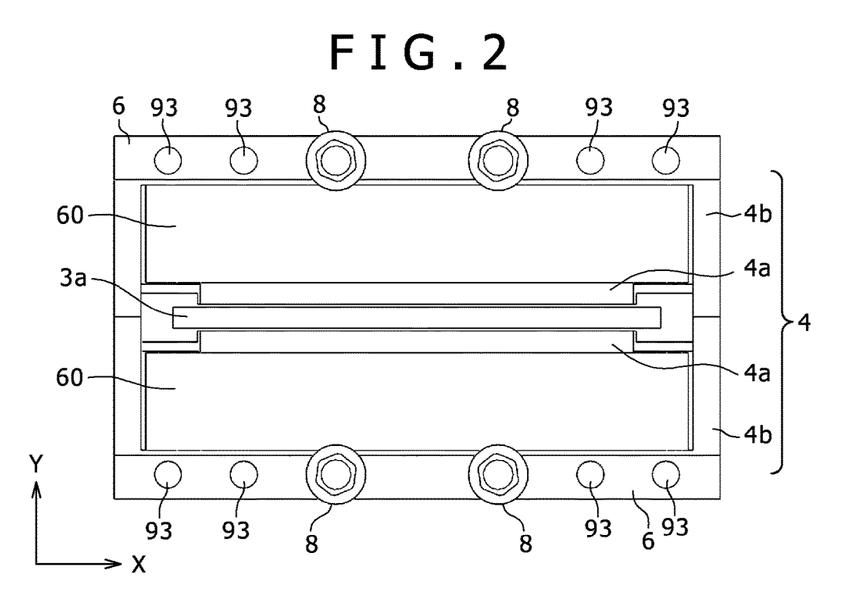
FIG. 2 is a front view of the linear motor according to the first embodiment.

FIG. 1 is a perspective view of a linear motor 1 according to the embodiment. FIG. 2 is a front view (seen from Z direction) of the linear motor 1 according to the embodiment.

The linear motor 1 includes an armature 2, and a mover (not shown) having a flat plate-like permanent magnet 3a. Since the mover may be appropriately designed to have an arbitrary shape in accordance with the device to which the present invention is applied, the mover is not shown in the embodiment. The shape of the mover is not specifically limited so long as it is disposed in the air gap between two magnetic pole teeth part 4a to be described below, and movable in the Z direction. For example, the mover may be formed into the flat plate-like shape. The mover according to the embodiment has the single permanent magnet 3a with flat plate shape, which is magnetized in the Y direction. It is possible to arrange a plurality of permanent magnets 3a in the Z direction. In the case where a plurality of permanent magnets 3a are arranged, the respective polarities of the magnets in the Y direction may be alternately inverted.

The mover is movable relative to the armature 2 in the Z direction.

The length of the permanent magnet 3a in the Z direction is equal to or shorter than the distance between centers of the magnetic poles 4, that is, the total of dimensions of a first auxiliary magnetic pole 5, two bridges 7, and the single magnetic pole 4 in the Z direction.

<Armature 2>

[Outline of Armature 2]

The armature 2 includes two magnetic poles 4, two first auxiliary magnetic poles 5, four end bridges 6, four winding wires 60, four bridges 7, and four armature fixing bolts 8.

Each of the magnetic poles 4 includes two opposite magnetic pole teeth parts 4a (magnetic pole teeth group) via an air gap in the Y direction. Each of the magnetic pole teeth parts 4a is wound with the winding wire 60. The winding wire 60 may be wound around at least one of those two magnetic pole teeth parts 4a arranged in the Y direction. Preferably, the winding wires are wound around both magnetic pole teeth parts so as to supply more magnetic flux.

There are two first auxiliary magnetic poles 5 each as the magnetic substance disposed in the Y direction between the two magnetic poles 4 arranged in the Z direction. Each of the bridges 7 is disposed between the magnetic pole 4 and the first auxiliary magnetic pole 5 so that the distance therebetween is defined. The first auxiliary magnetic pole 5 includes a first auxiliary magnetic pole teeth part 5a. The two opposite first auxiliary magnetic teeth parts 5a (auxiliary magnetic teeth group) in the Y direction are located at both sides of the permanent magnet 3a via the air gap in the Y direction. The material for forming the first auxiliary magnetic pole 5 is not limited so long as it is formed as the magnetic substance, which may be a metallic plate such as iron, the magnetic steel plates laminated in the Z direction, and the soft magnetic material such as a soft ferrite.

The mover and the permanent magnet 3a are located in the air gap between the magnetic pole teeth groups, which move in the Z direction relative to the armature 2. The armature 2 has substantially a rectangular parallelepiped shape, which allows effective arrangement of a plurality of linear motors 1 or a plurality of armatures 2 in the X or Y direction.

In the embodiment, two magnetic poles 4 are arranged in the Z direction. However, the number of the magnetic poles to be arranged is arbitrarily set so long as the number is two or larger. For example, if three magnetic poles 4 are arranged, four first auxiliary magnetic poles 5 will be disposed between the respective magnetic poles 4.

[Magnetic Pole 4]

The armature 2 is configured to have the magnetic flux distribution part with higher conductivity and higher permeability orthogonally directed to the relative moving direction (Z direction) of the armature 2 and the mover. In other words, the conductivity and the permeability of the magnetic pole 4 in the X and Y directions are higher than those in the Z direction so as to exhibit anisotropy. In the embodiment, the magnetic pole 4 is produced by the laminated steel plate derived from laminating a plurality of magnetic steel plates as the magnetic substance in the Z direction. The magnetic flux generated by the current applied to the winding wire 60 allows the magnetic pole 4 to have a loop substantially in parallel with the XY plane.

Referring to FIG. 2, the magnetic pole 4 is structured to be separable into two half-magnetic poles each having a single magnetic pole teeth part 4a (upper and lower half sections of the magnetic pole 4 shown in FIG. 2). This makes it possible to improve assembling efficiency of the winding wire 60 to the magnetic pole teeth part 4a, and assembly workability of the armature 2.

[First Auxiliary Magnetic Pole 5]

Figure 3:
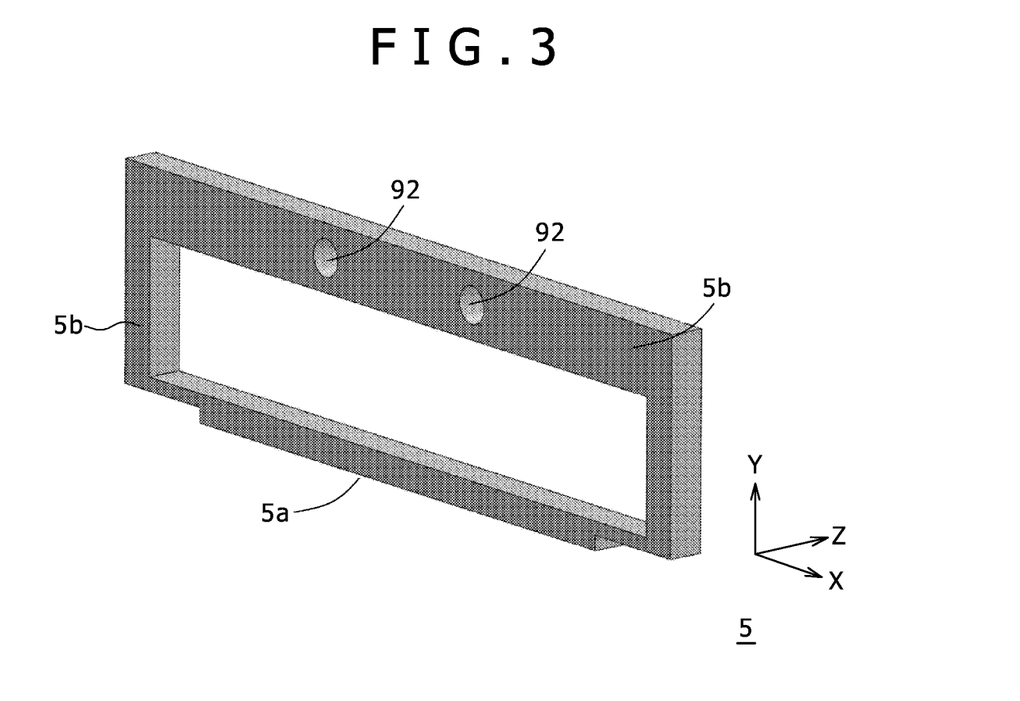
FIG. 3 is a perspective view of a first auxiliary magnetic pole.

FIG. 3 is a perspective view of the first auxiliary magnetic pole 5 of the embodiment. The bridges 7 are disposed at both sides of a base end 5d of the first auxiliary magnetic pole 5 in the Z direction. The base end 5d has insertion holes 92.

The first auxiliary magnetic pole 5 extending along the Y direction includes connecting portions 5b for connecting the base end 5d and the auxiliary magnetic pole teeth part 5a. The first auxiliary magnetic pole 5 has a space defined by the base end 5d, the connecting portions 5b, and the auxiliary magnetic pole teeth part 5a. The space allows the first auxiliary magnetic pole 5 to be communicated in the Z direction, which is larger than the XY dimension where the winding wire 60 is disposed when seen from the Z direction. This makes it possible to partially provide the winding wire 60 in the space, thus increasing the space for accommodating the winding wire 60. In other words, the number of turns of the winding wire 60 may be increased.

Alternatively, the space may be replaced with a recess thinner than each of the base end 5d, the connection portions 5b, and the auxiliary magnetic pole teeth part 5a in the Z direction.

<Insertion Holes 91 to 94>

Figure 4:
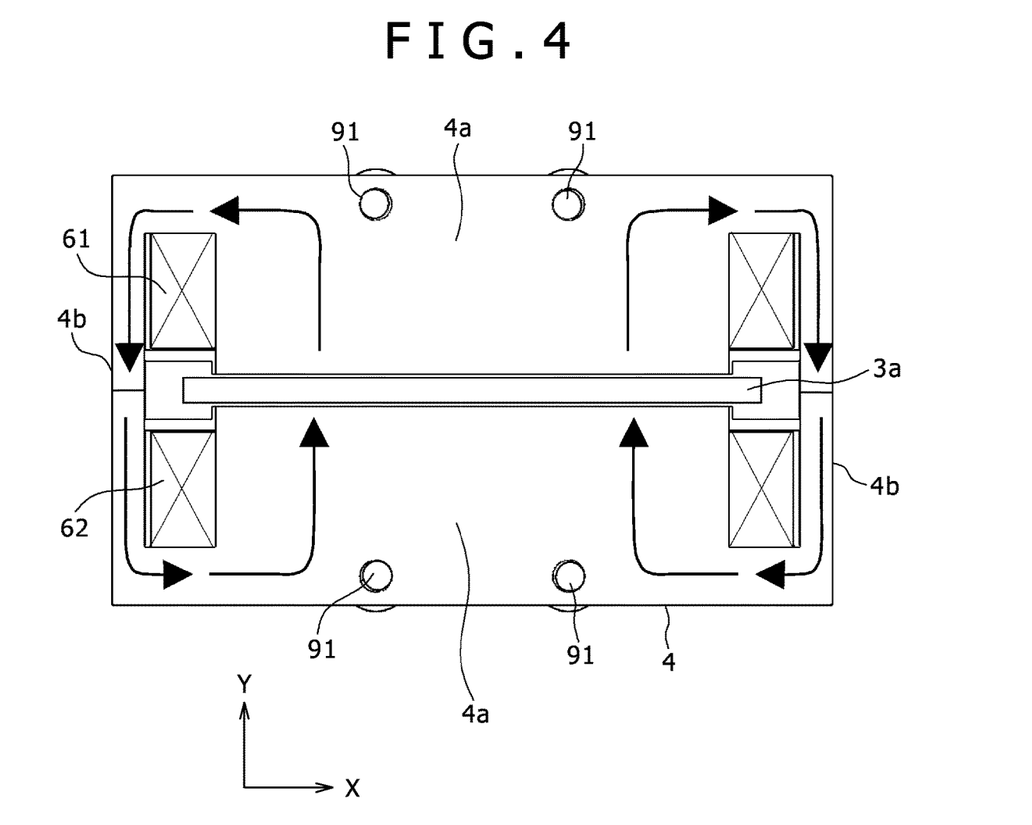
FIG. 4 is an XY plane section of the linear motor according to the first embodiment.

The magnetic pole 4, the first auxiliary magnetic pole 5, and an end bridge 6 have insertion holes 91, 92, 93, respectively (see FIGS. 2 to 4). The bridge 7 also has an insertion hole 94 (not shown). The armature 2 allows insertion of the armature fixing bolts 8 into the insertion holes 91 to 94, which makes it possible to efficiently fix the laminated steel plate of the magnetic pole 4, the first auxiliary magnetic pole 5, the end bridge 6, and the bridge 7, which have been laminated in the Z direction. In the embodiment, four armature fixing bolts 8 penetrate through the armature 2 in the Z direction so as to be fastened with nuts from both sides in the Z direction for fixing the armature 2. In this way, the armatures 2 may be assembled one by one, improving assembly workability. The member for fixing the armature 2 is not limited to the bolt, which is allowed to use caulking pins. It is preferable to fix the armature 2 with the member extending in the Z direction through the insertion hole so that the armature 2 is assembled into a compact structure.

In the embodiment, each number of the insertion holes 92 and 93 is four corresponding to the number of the armature fixing bolts 8. Referring to the insertion holes 93 (shown in FIG. 2), upon use of a plurality of armatures 2 for manufacturing the linear motor 1, the insertion holes 91 to 94 more than the armature fixing bolts 8 allow the individually assembled armatures 2 to be collectively fixed using another fixing member such as bolts. Like the case as described above, upon use of the linear motor 1 for manufacturing the device such as the compressor, the linear motor 1 and the cylinder block or the like may be fixed collectively. In the embodiment, the end bridge 6 has many insertion holes 93. It is possible to lessen each number of the insertion holes 91, 92, 94 by using members which can be screwed with the insertion holes 93.

<Current Flowing Through Winding Wire 60 and Generated Magnetic Flux>

[Magnetic Flux Path]

Figure 5:
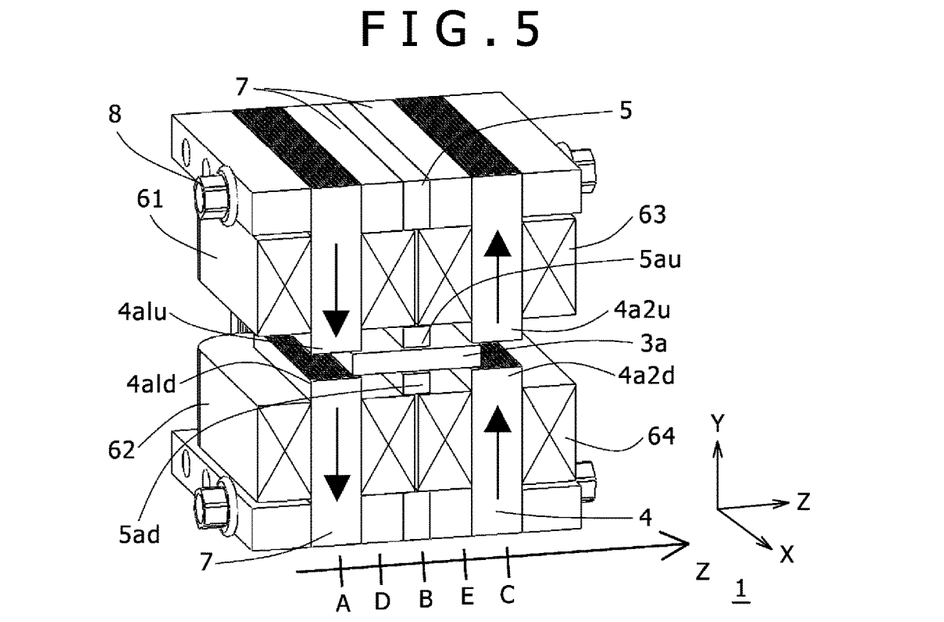
FIG. 5 is a perspective view of a YZ plane section of the linear motor according to the first embodiment.

FIG. 4 is a view of an XY plane section of the linear motor 1. FIG. 5 is a perspective view of a YZ plan section of the linear motor 1. Solid arrows shown in the drawing represent an example of the magnetic flux flow upon motor driving.

The magnetic pole 4 includes cores 4b extending in the Y direction at both ends of the magnetic pole teeth parts 4a in the X direction. The cores 4b serve to connect two half magnetic poles (upper half and lower half sections of the magnetic pole 4 shown in FIG. 2), which constitute a magnetic circuit including the permanent magnet 3a, the two opposite magnetic pole teeth parts 4a in the Y direction, and the cores 4b. Application of current to the winding wire 60 (upper wiring wire 61 and/or lower wiring wire 62) generates the magnetic flux flowing through the magnetic pole teeth part 4a around which the wiring wire 60 is wound. As described above, the magnetic pole 4 generates the magnetic flux loop along the XY plane. The direction of the magnetic flux loop may be varied by controlling direction of the current applied to the wiring wire 60. In the embodiment, the linear motor 1 is driven while controlling directions of the magnetic flux loops flowing through the two magnetic poles 4 to be reversed (reverse phases).

The magnetic pole 4 may be formed into an arbitrary shape so long as the magnetic flux loop may be formed. The magnetic pole 4 according to the embodiment has a shape having the cores 4b at both sides of the magnetic flux teeth parts 4a, that is, two half magnetic poles are connected to form the "E"-like shape. It is also possible to form the "C"-like shape.

[Suppression of Magnetization of First Auxiliary Magnetic Pole 5]

The first auxiliary magnetic pole 5 suppresses detent caused by the armature 2 to improve controllability and noise reduction of the linear motor 1. The detailed explanation will be described later. The structure for suppressing magnetization of the first auxiliary magnetic pole 5, and the resultant effect will be described hereinafter.

The magnetic pole 4 exhibits the above-described anisotropic property in the conductivity and permeability resulting from laminated magnetic steel plate. Then the linear motor 1 forms the magnetic flux loop in parallel with the XY plane on the magnetic pole 4. The bridge 7 allows the magnetic pole 4 and the first auxiliary magnetic pole 5 to be apart from each other in the direction (Z direction) orthogonal to the plane (XY plane) where the loop is generated. This makes it possible to suppress magnetic flux leakage from the magnetic pole 4 to the first auxiliary magnetic pole 5. That is, the bridge 7 allows suppression of magnetization of the first auxiliary magnetic pole 5. Excessive leakage of the magnetic flux to the first auxiliary magnetic pole 5 necessitates the design in consideration of the effect resulting from magnetizing the first auxiliary magnetic pole 5, and saturation of the magnetic flux. The first auxiliary magnetic pole 5 perpendicularly directed to the plane where the magnetic flux loop is generated allows suppression of magnetizing the first auxiliary magnetic pole 5, resulting in improved flexibility in design and the compact linear motor 1.

It is preferable to lower the conductivity and permeability of the bridge 7 in the Z direction for the purpose of further suppressing the magnetic flux leakage in the Z direction. It is preferable to use non-magnetic material, for example, aluminum alloy, a certain type of stainless-steel based metal, the resin material, or the steel plates laminated in the Z direction for forming the bridge 7. Most preferably, the non-magnetic material is used to form the bridge 7 so as to effectively suppress the magnetic flux leakage to the first auxiliary magnetic pole 5.

[Connection Relationship of Wiring Wire 60]

Four wiring wires 60 and four magnetic pole teeth parts 4a shown in FIG. 5 will be designated individually using the respective signs.

Referring to FIG. 5, the armature 2 includes a magnetic pole teeth part 4a1d opposite a magnetic pole teeth part 4a1u in the Y direction, a magnetic pole teeth part 4a2u adjacent to the magnetic pole teeth part 4a1u in the Z direction, and a magnetic pole teeth part 4a2d diagonally opposite the magnetic pole teeth part 4a1u. Connection relationship among wiring wires 61, 62, 63, 64 respectively wound around the magnetic pole teeth parts 4a1u, 4a1d, 4a2u, 4a2d will be described.

The wiring wires 61 and 63 arranged in the Z direction are electrically coupled, and the wiring wires 62 and 64 arranged in the Z direction are electrically coupled. In other words, the in-phase current is applied to the wiring wires 61 and 63 arranged in the Z direction, and the in-phase current is applied to the wiring wires 62 and 64. As the wiring wires 61 and 63, and 62 and 64 are electrically coupled, respectively, the voltage between those wires exhibits the small value in accordance with the lead length. Accordingly, in the case where the two wiring wires 60 adjacent in the Z direction are brought into contact with each other, insulation deterioration owing to partial discharge and the like hardly occurs, which makes the short-circuit unlikely to occur. As described above, it is possible to form the recess portion by reducing the thickness of the first auxiliary magnetic pole 5 in the Z direction, and the space in the first auxiliary magnetic pole 5 for accommodating the wiring wire 60. As the process of insulating coating of the wiring wire 60 and the like may be easily executed, it is possible to increase the number of turns of the wiring wire 60, thus realizing high outputs of the linear motor 1.

The wiring wires 61 and 62 arranged in the Y direction are electrically coupled, and the wiring wires 63 and 64 are further electrically coupled. It is therefore possible to align current phases for generating the respective magnetic flux loops in the XY plane.

The wiring wires 60 may be electrically coupled either in series or in parallel. The current applied to the winding wires 60 may be formed into a sine wave AC or a rectangular wave AC. The waveform may be shaped using the inverter. The DC current may be applied either continuously or discretely.

[Magnetization Relationship of Magnetic Pole Teeth Part 4a]

As described above, the embodiment is configured to oppositely direct the two magnetic flux loops induced by the current to the wiring wire 60 in the XY plane. When the magnetic pole teeth part 4a1u is magnetized to N pole, the opposite magnetic pole teeth part 4a1d and the adjacent magnetic pole teeth part 4a2u are magnetized to S pole as unlike pole, and the diagonally opposite magnetic pole teeth part 4a2d is magnetized to N pole as a like-pole. The magnetization may be carried out by adjusting the winding direction of the winding wires 61 to 64, and direction of the current to be applied.

Even if the magnetic flux leakage occurs via the bridge 7, the magnetic fluxes each with the opposite phase pass through the first auxiliary magnetic pole 5. As a result, magnetization of the first auxiliary magnetic pole 5 may be suppressed.

<Suppression of Detent>

The force received by the mover corresponds to a sum of the force exerted to the permanent magnet 3a. Each of one or more permanent magnets 3a of the mover receives the magnetic force derived from magnetization of the magnetic pole teeth part 4a, and the detent force (magnetic attraction force) from the magnetic substance part of the armature 2.

The detent is determined by the relative positional relationship between the permanent magnet 3a and the magnetic substance part of the armature 2. As the mover moves in the Z direction, large fluctuation in the detent at the position of the permanent magnet 3a in the Z direction causes the thrust ripple upon driving of the mover. This may deteriorate controllability of the linear motor 1. In the case of a plurality of armatures 2, the design for setting off the detent may be employed by forming the multilayer driving structure, and optimizing the pitch of the armature 2. However, the design on the assumption of a plurality of armatures 2 and phases will make it difficult to downsize the linear motor 1.

In the embodiment, since the detent caused by the armature 2 is suppressed by the first auxiliary magnetic pole 5 provided for the armature 2, it is possible to improve controllability of the linear motor 1 which is driven through multiphase with the plural armatures 2 and phases as well as the single-phase, which will be described in detail hereinafter.

Detent Force of Comparative Example

Figure 6:
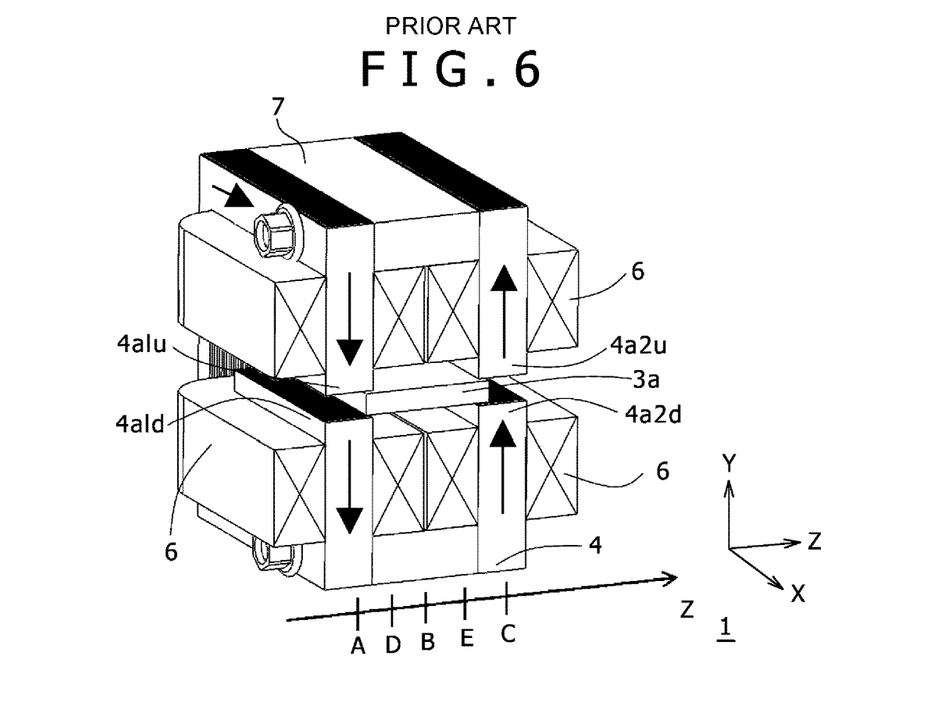
FIG. 6 is a perspective sectional view of a linear motor as a comparative example.
Figure 7:
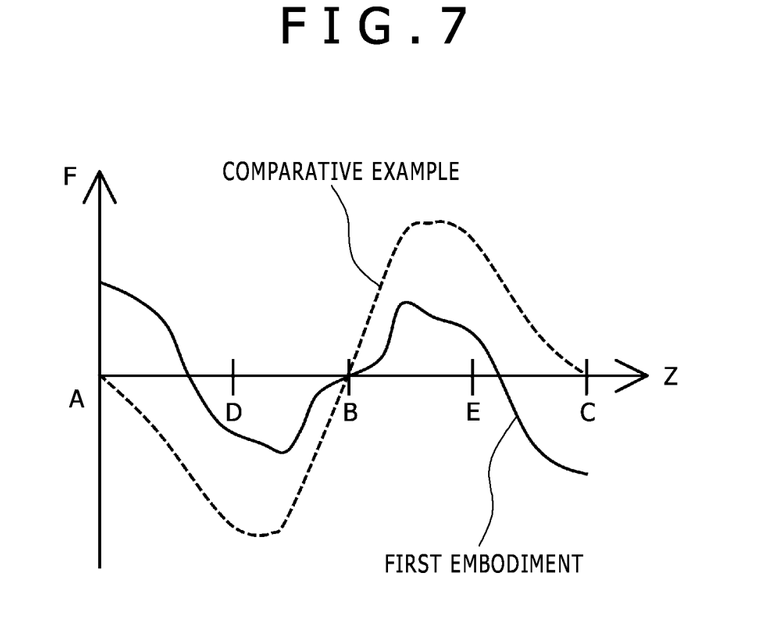
FIG. 7 is a view representing a relationship between detent force and the permanent magnet position of the first embodiment in comparison with the comparative example.

The detent force F in a comparative example will be described. FIG. 6 is a perspective sectional view of a linear motor 10 as the comparative example, which has the similar structure to that of the linear motor 1 according to the embodiment except that the armature does not include the first auxiliary magnetic pole 5. FIG. 7 is a view representing the relationship between the detent force F (y-axis) received by the permanent magnet 3a and the position of the permanent magnet 3a (x-axis) at the center in the Z direction of the embodiment in comparison with the comparative example. The forward direction of the detent force F is defined as the +Z axial direction. In this case, each forward direction of the X, Y, and Z axes will be referred to as +X, +Y, and +Z directions. The reverse directions will be referred to as −X, −Y, and −Z directions, respectively.

A point A represents Z coordinates of the magnetic pole teeth group $4a1$ including the magnetic pole teeth parts $4a1u$ and $4a1d$. A point C represents the Z coordinates of the magnetic pole teeth group $4a2$ including the magnetic pole teeth parts $4a2u$ and $4a2d$. A point B as a midpoint between the points A and C represents the Z coordinates of the auxiliary magnetic pole teeth group including the first auxiliary magnetic pole teeth parts $5au$ and $5ad$. A point D is a midpoint between the points A and B, and a point E is a midpoint between the points B and C.

The permanent magnet 3a at the point A receives the magnetic attraction force mainly from the magnetic pole teeth group $4a1$. Directions of the respective forces are in the +Y and −Y directions, which are canceled to provide the resultant force of zero. The detent force F caused by the magnetic pole teeth group $4a1$ becomes zero. As the magnetic attraction force is proportional to the inverse square of the distance, the detent force F added in the +Z direction, which is caused by the magnetic pole teeth group $4a2$ exhibits a small value which will be ignored for explanation convenience.

As the permanent magnet 3a moves in the +Z direction to reach the point D, the magnetic attraction force received by the permanent magnet 3a from the magnetic pole teeth group $4a1$ generates the component in the −Z direction. Simultaneously, since the permanent magnet 3a approaches the magnetic pole teeth group $4a2$, the influence of the magnetic attraction force caused by the magnetic pole teeth group $4a2$ in the +Z direction becomes relatively large. The magnetic attraction force received from the magnetic pole teeth group $4a1$ is larger than the one received from the magnetic pole teeth group $4a2$. The detent force F, thus exhibits a negative value.

As the permanent magnet 3a moves in the +Z direction to reach the midpoint B between the two magnetic poles 4, the detent force F becomes zero again. The sum of the force becomes zero because the respective magnetic attraction forces received from the magnetic pole teeth groups $4a1$ and $4a2$ exhibit equal values and are oppositely directed.

As the permanent magnet 3a moves in the +Z direction to reach the point E, the magnetic attraction force of the magnetic pole teeth group $4a2$ becomes dominant, thus bringing the detent force F into the positive value.

As the permanent magnet 3a reaches the point C, the detent force F caused by the magnetic pole teeth group $4a2$ becomes zero because the detent force F applied in the −Z direction owing to the magnetic pole teeth group $4a1$ exhibits the small value.

The relationship between the detent force F and the position Z of the permanent magnet 3a of the linear motor 10 according to the comparative example is indicated by the dashed line in FIG. 7. The graph clearly shows that the permanent magnet 3a receives large detent force F from the armature 2 at the points D and E at the inner side of the armature 2 in the Z direction.

Detent Force of the Embodiment

The detent force F of the linear motor 1 according to the embodiment, in the case where the first auxiliary magnetic pole 5 is located at the point B will be described. The detent force F generated in the linear motor 1 according to the embodiment is derived from the sum of the magnetic attraction force generated in the permanent magnet 3a of the linear motor 10 according to the comparative example, and the magnetic attraction force received by the permanent magnet 3a from the first auxiliary magnetic pole 5.

For example, existence of the magnetic attraction force at the point A in the +Z direction, which is received by the permanent magnet 3a from the first auxiliary magnetic pole 5 allows the detent force F to have the positive value while having the absolute value larger than that of the comparative example.

Similarly, existence of the magnetic attraction force at the point C in the −Z direction, which is received by the permanent magnet 3a from the first auxiliary magnetic pole 5, allows the detent force F to have the negative value while having the absolute value larger than that of the comparative example.

At the midpoint B, the component of the magnetic attraction force in the Z direction received by the permanent magnet 3a from the first auxiliary magnetic pole 5 becomes zero. Accordingly, like the comparative example, the detent force F takes the value of zero. It is also possible to provide the single unit of the first auxiliary magnetic pole 5 in the Y direction without forming the auxiliary magnetic pole teeth group having two opposite auxiliary magnetic poles disposed in the Y direction. The auxiliary magnetic pole teeth group of the embodiment allows setting of the component of the detent force in the Y direction to zero. This makes it possible to reduce the force applied to the mechanism (not shown) for holding the mover in the Y direction, thus allowing suppression of the friction loss in the holding mechanism.

At the point D, the magnetic attraction force received by the permanent magnet 3a from the first auxiliary magnetic pole 5 acts in the +Z axial forward direction. Then the detent force F exhibits the negative value while having the absolute value smaller than that of the comparative example. Similarly, the detent force F at the point E exhibits the positive value while having the absolute value smaller than that of the comparative example.

The resultant relationship between the detent force F and the position Z of the permanent magnet 3a of the embodiment is indicated by the solid line in FIG. 7. The maximum amplitude value of the detent force F may be reduced to be less than the comparative example so that controllability is improved. It is also possible to suppress the detent force at the points D and E at the inner side of the armature 2 in the Z direction to allow further improvement of controllability by driving to remove the regions around the points A and C from the motion range of the permanent magnet 3a.

The aforementioned structure may suppress magnetization of the first auxiliary magnetic pole 5, which makes it possible to downsize the linear motor 1 while improving the controllability.

<Other Structures>

[Lamination Direction of Magnetic Pole 4]

The electromagnetic steel plates laminated in the X direction may be used for producing the magnetic pole 4. In this case, the linear motor 1 is driven by the magnetic flux for forming the loop in parallel with the YZ plane. Therefore, it is preferable to allow passage of the magnetic flux by using the magnetic substance for forming the bridge 7. In the aforementioned case, leakage of the magnetic flux to the first auxiliary magnetic pole 5 is likely to occur. It is therefore necessary to design in consideration of effect of magnetizing the first auxiliary magnetic pole 5, and saturation of the magnetic flux. It is preferable to use the magnetic steel plates laminated in the Z direction for producing the magnetic pole 4 from downsizing aspect.

As described above, each of the magnetic fluxes passing through the two adjacent magnetic pole teeth parts 4a at both sides of the first auxiliary magnetic pole 5 in the Z direction is oppositely directed (reverse phase). It is possible to offset some of or all the magnetic fluxes flowing through the first auxiliary magnetic pole 5. Accordingly, the magnetic pole 4 constituted by the magnetic steel plates laminated in the X direction allows suppression of magnetizing the first auxiliary magnetic pole 5. The linear motor 1 may be designed to be downsized on the assumption that the first auxiliary magnetic pole 5 is not magnetized. While the permanent magnet 3a deviates from the exact front of the auxiliary magnetic pole teeth part 5a (point B), the magnetic flux leakage to the first auxiliary magnetic pole 5 is likely to occur. As a result, there may be the risk of deterioration in controllability of the linear motor 1 under the influence of leaked magnetic flux. It is therefore preferable to use the magnetic steel plates laminated in the Z direction for producing the magnetic pole 4, from the aspect of controllability and downsizing.

The armature disclosed in the above-described WO2004/093301 is produced by punching the magnetic steel plate into a serrated shape (see page 4, line 32). In other words, the respective magnetic steel plates extend in the direction in parallel with the drawing of FIG. 1. The linear motor described in WO2004/093301 exhibits large values of conductivity and permeability in the relative moving direction between the mover and the armature than those in the direction orthogonal to the aforementioned direction. The large magnetic flux flows not only to the teeth wound with coil but also to the teeth wound with no coil (see page 7, lines 19 to 36). It is therefore difficult to establish downsizing and/or controllability of the motor.

[Relationship Between the Numbers of Permanent Magnets 3a and Magnetic Poles 4]

It is preferable to set the total of the number of the permanent magnets 3a of the mover, and the number of the magnetic poles 4 of the armature 2 to the odd number from downsizing aspect. Most preferably, the number of the magnetic poles 4 is set to two, and the number of the permanent magnets 3a is set to one from the aspect of downsizing the linear motor 1.

[Motion Range of Mover]

In the region around the points A and C shown in FIG. 5 at the ends of the armature 2, there may be the case where the detent is intensified depending on the shape and material for forming the first auxiliary magnetic pole 5. It is possible to drive the linear motor 1 only in the region at which the detent force F is small by controlling to remove the ends of the armature 2 from the motion range of the permanent magnet 3a. In other words, controllability of the linear motor 1 may be improved by controlling the permanent magnet 3a to move at inner sides between the two magnetic pole teeth groups 4a1, 4a2 in the Z direction. The center of the permanent magnet 3a in the Z direction, and each center of the magnetic pole teeth groups 4a1, 4a2 in the Z direction may be set to the corresponding reference positions, respectively. All the permanent magnets 3a may be controlled to be positioned at the side inner than the innermost sides between the magnetic pole teeth groups 4a1 and 4a2 in the Z direction from aspect of suppressing the detent most effectively.

[Example of Armature 2 and Mover]

The linear motor 1 of the embodiment is of moving magnet type having the mover driven and the armature 2 fixed. It is also possible to use the motor of moving coil type having the mover fixed, and the armature 2 movable.

A plurality of armatures 2 according to the embodiment may be arranged in the Z direction so as to constitute the linear motor 1 with multiphase drive.

Two opposite first auxiliary magnetic poles 5 in the Y direction may be connected with each other via the core.

<Effect>

According to the embodiment, the first auxiliary magnetic pole 5 disposed between the two magnetic poles 4 of the armature 2 allows suppression of the detent caused by the armature 2, thus improving controllability.

The embodiment is configured that the direction in which the magnetic pole 4 exhibits high conductivity and high permeability is orthogonal to the relative moving direction (Z direction) between the armature 2 and the mover. This makes it possible to suppress magnetization of the first auxiliary magnetic pole 5, and achieve downsizing and/or improved controllability.

Furthermore, the first auxiliary magnetic pole 5 has the space or recess portion to increase the number of turns of the winding wire 60 to achieve both downsizing and high output. The current flowing to the adjacent winding wire in the Z direction may have either the coordinate phase or reverse phase so long as it is in-phase.

The embodiment is configured to allow suppression of the detent caused by the armature 2. The use of a few armatures 2 or the compact armature 2 (that is, a few magnetic pole teeth parts 4a) allows improved controllability. It is therefore possible to achieve both improved controllability and downsizing.

The embodiment is configured to have the opposite magnetic pole teeth groups 4a1, 4a2 in the Y direction, and the auxiliary magnetic pole teeth group 5a, thus offsetting the detent in the Y direction.

The use of the insertion hole and the fixing member such as the armature fixing bolt 8 achieves improved assembly workability and downsizing.

Second Embodiment

A second embodiment according to the present invention will be described referring to FIGS. 8 and 9. The structure of the embodiment which is different from that of the first embodiment will be described hereinafter.

Figure 8:
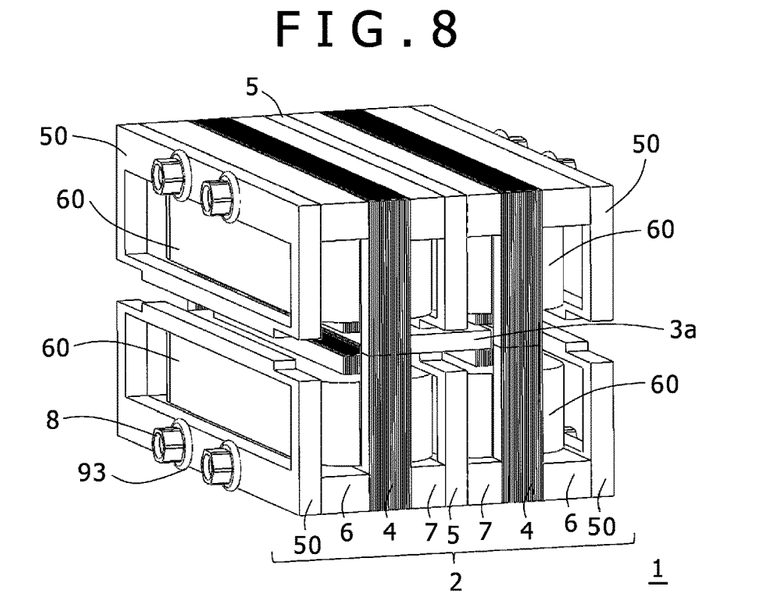
FIG. 8 is a perspective view of a linear motor according to a second embodiment.
Figure 9:
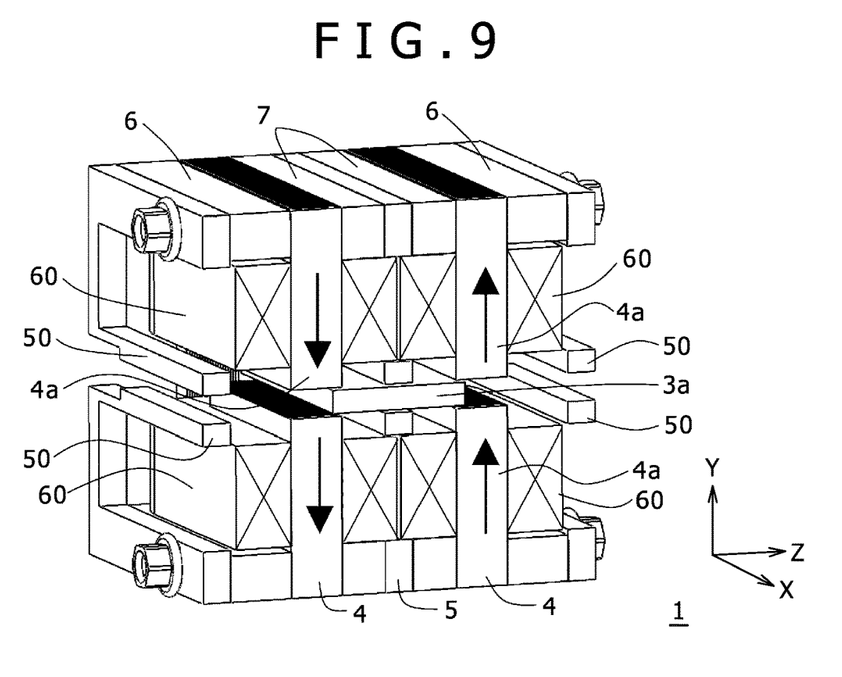
FIG. 9 is a perspective view of a YZ plane section of the linear motor according to the second embodiment.

FIG. 8 is a perspective view of the linear motor 1 of the embodiment. FIG. 9 is a perspective sectional view of the linear motor 1 of the embodiment.

[Second Auxiliary Magnetic Pole 50]

This embodiment is configured to dispose second auxiliary magnetic poles 50 at both sides of the armature 2 (outside the magnetic pole 4 in Z direction) via the end bridges 6. The end bridge 6 serves to separate the magnetic pole 4 and the second auxiliary magnetic pole 50 from each other in the Z direction so that the magnetic flux leakage to the second auxiliary magnetic pole 50 is suppressed. The second auxiliary magnetic pole 50 has the same structure as that of the first auxiliary magnetic pole 5, and the end bridge 6 may be structured similar to the bridge 7. The second auxiliary magnetic pole 50 has an insertion hole (not shown) which allows insertion of the fixing member.

The first auxiliary magnetic pole 5 and the second auxiliary magnetic pole 50 will be collectively referred to as "auxiliary magnetic poles 5, 50" hereinafter.

The auxiliary magnetic poles 5, 50 are disposed at both sides of the magnetic poles 4 in the Z direction. That is, the first auxiliary magnetic pole 5 is positioned at inner sides of the magnetic poles 4 in the Z direction, and the second auxiliary magnetic poles 50 are disposed at outer sides of the magnetic poles 4 in the Z direction. Specifically, since the auxiliary magnetic poles 5, 50 are disposed in +Z and −Z directions when seen from the points A and C as positions of the magnetic pole teeth groups 4a1, 4a2, respectively, the respective detent forces F at the points A and C may be reduced.

The embodiment is capable of providing similar effects to those derived from the first embodiment. Suppression of the detent forces at the points A and C around the ends of the armature 2 allows retention of controllability even if the movable range of the mover in the Z direction is expanded. This makes it possible to establish both improved controllability and high output of the linear motor 1.

Third Embodiment

[Magnetic Pole Structure at One Side]

Figure 11:
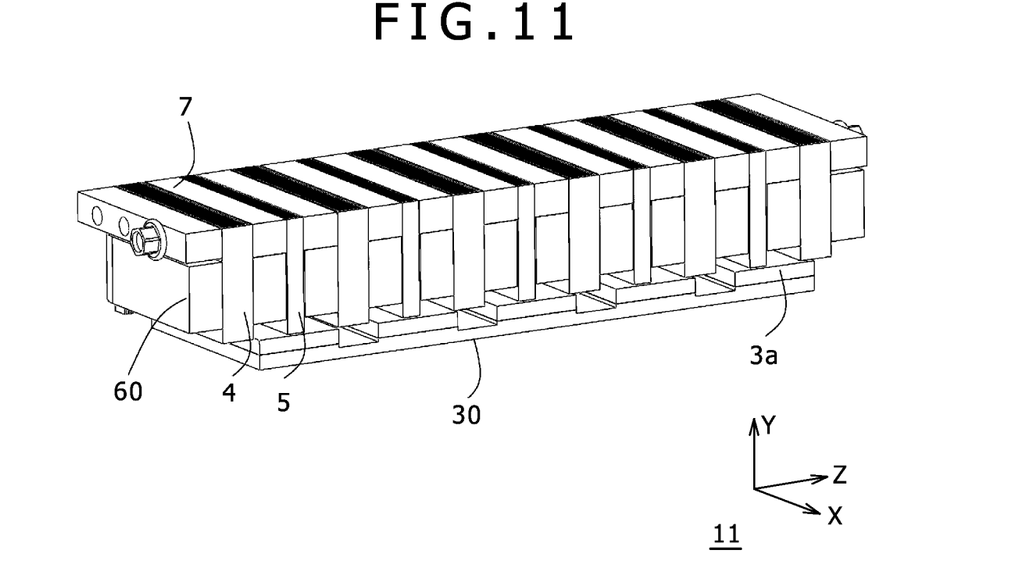
FIG. 11 is a perspective sectional view of the linear motor according to the third embodiment.
Figure 12:
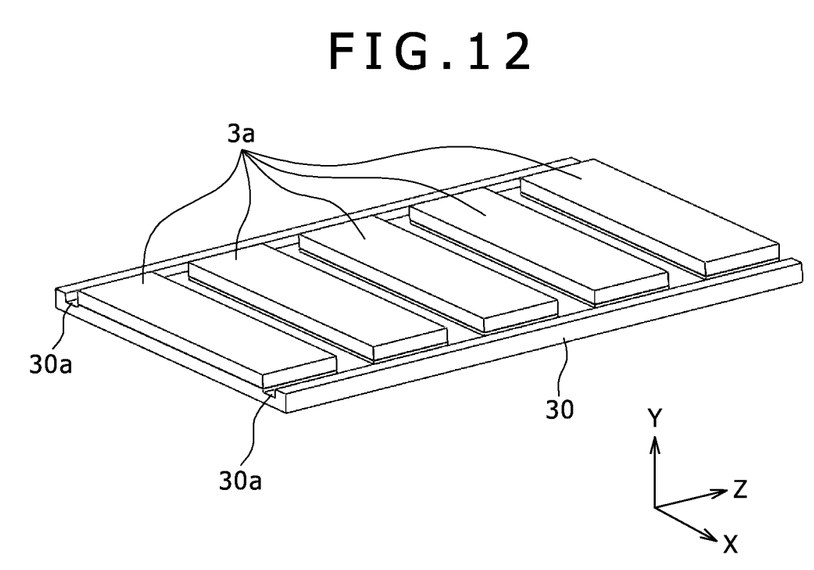
FIG. 12 is a perspective view of a mover according to the third embodiment.

A third embodiment according to the present invention will be described referring to FIGS. 10 to 12. The structure of the embodiment, which is different from those of the first and the second embodiment will be described hereinafter.

Figure 10:
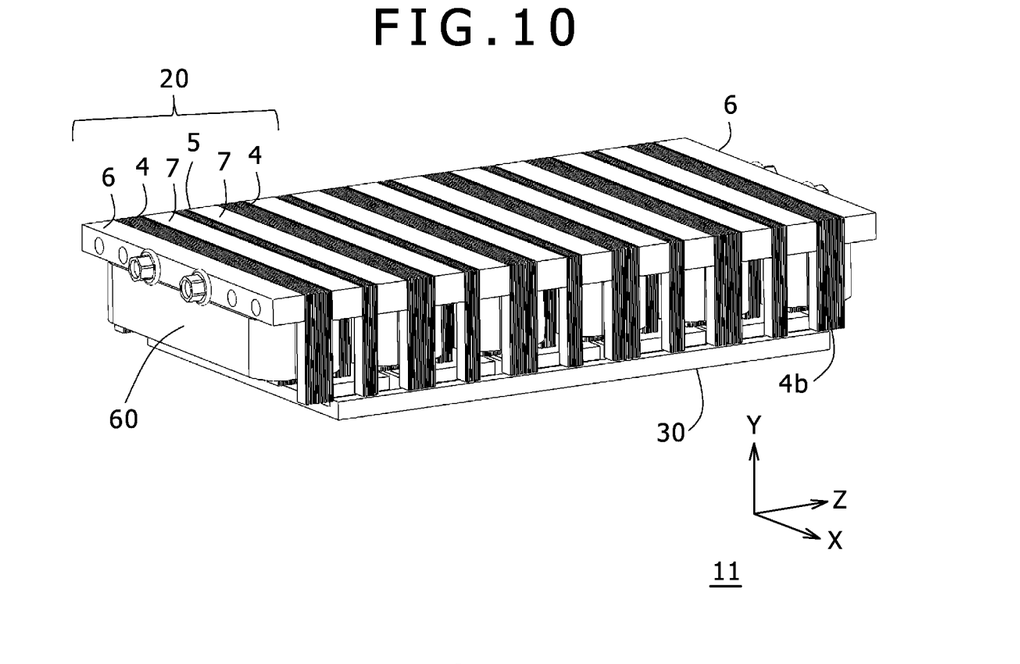
FIG. 10 is a perspective view of a linear motor according to a third embodiment.

FIG. 10 is a perspective view of the linear motor 11 according to the embodiment. FIG. 11 is a perspective view of a YZ plane section of the linear motor 11 according to the embodiment. FIG. 12 is a perspective view of the mover according to the embodiment.

The armature 20 includes the magnetic poles 4 and the first auxiliary magnetic poles 5 arranged alternately having the bridges 7 interposed therebetween. The linear motor 11 according to the embodiment includes six magnetic poles 4, and five first auxiliary magnetic poles 5. However, the structure is not limited to the one as described above so long as two or more magnetic poles 4 and one or more first auxiliary magnetic poles 5 are provided. The armature 20 includes the end bridge 6 at the end in the Z direction.

The mover includes the permanent magnets 3a and a back yoke 30, and concave sections 30a extending along the Z direction, which is formed around the permanent magnet 3a at the outer side in the X direction. The length of the permanent magnet 3a in the X direction is shorter than the distance between the concave sections 30a in the X direction. As a result, the magnetic flux looping in the XY plane is allowed to easily pass through the permanent magnet 3a and the magnetic pole teeth parts 4a, 4b so as to reduce the leaked magnetic flux. The concave section 30a serves to suppress the magnetic flux from avoiding the permanent magnet 3a, thus providing the highly efficient linear motor 11.

The embodiment is capable of providing similar effects to those derived from the first or the second embodiment. The resultant linear motor has the dimension further reduced in the Y direction.

Fourth Embodiment

<Device Equipped with Linear Motor>

This embodiment is formed as the device equipped with the linear motor 1 or 11. The device equipped with the linear motor 1 will be described hereinafter.

[Compressor 100]

Figure 13:
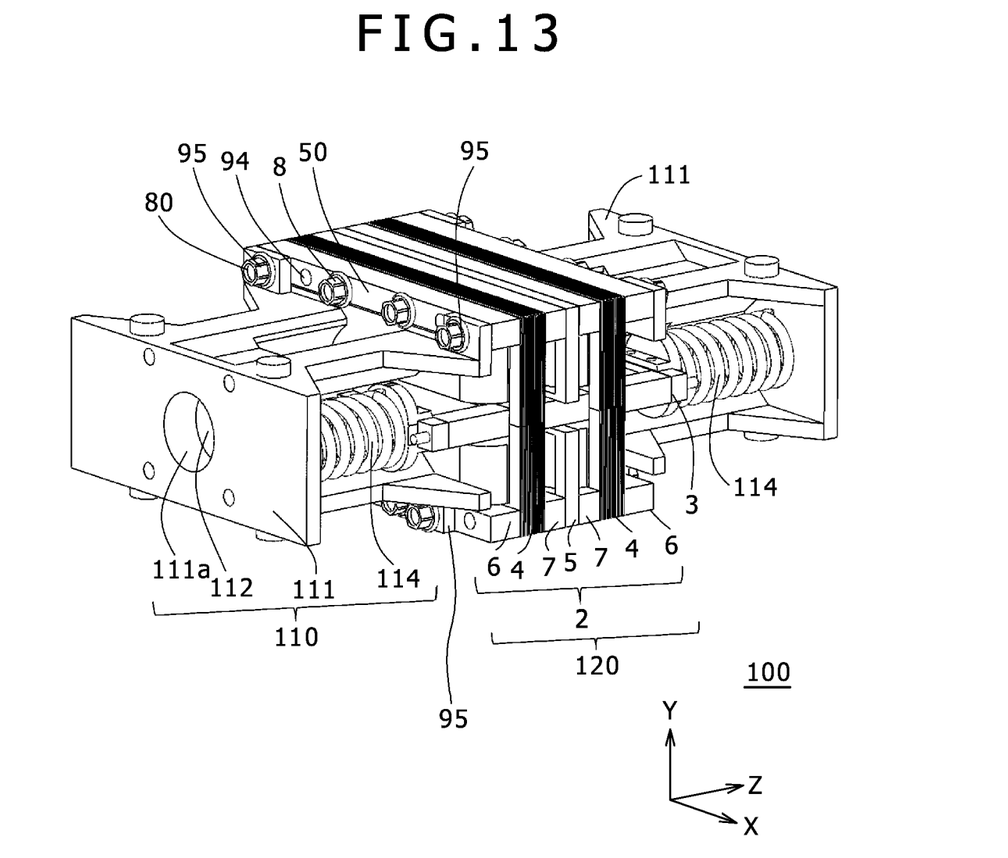
FIG. 13 is a perspective view of a compressor equipped with the linear motor.

FIG. 13 is a perspective view of a compressor 100 as an exemplary device equipped with the linear motor 1.

The compressor 100 is a reciprocating compressor including a compression element 110 and a motor element 120. The motor element 120 includes the armature 2 and the mover.

A flat plate-like mover 3 includes the flat plate-like permanent magnet 3a, and a piston 112 at one end in the Z direction. Application of current to the winding wire 60 of the motor element 120 imparts the reciprocating force in the Z direction to the mover 3 so that the piston 112 attached to the mover 3 reciprocates in a cylinder 111a.

The compression element 110 includes a cylinder block 111 that constitutes the cylinder 111a, and a cylinder head (not shown) that is assembled with the end surface of the cylinder block 111. The work fluid supplied into the cylinder 111a is compressed through reciprocating motion of the piston 112.

The mover 3 is connected to a resonant spring 114. In the case where the motor element 120 is driven to allow reciprocation of the mover 3 at the specific frequency, the restoring force of the resonant spring 114 causes resonance phenomena. In the resonant state, the mover 3 is allowed to reciprocate with less exciting force. If the motor element 120 is driven around the resonant frequency, the work fluid may be compressed by the reciprocating motion of the piston 112 with less power consumption.

The compressor 100 according to the embodiment includes the second auxiliary magnetic pole 50 with a plurality of insertion holes 94. The cylinder block 111 includes insertion holes 95. Those holes allow insertion of a cylinder fixing bolt 80 (second fixing member) for fixing the cylinder block 111 to the armature 2 in addition to the armature fixing bolt 8 (first fixing member) for fixing and fastening the magnetic poles 4, the first auxiliary magnetic poles 5, the end bridges 6, and the bridges 7 of the armature 2.

The second fixing member is inserted into the insertion holes 94 and 95 which are differently positioned from the insertion holes 91, 92, 93, 94 for insertion of the first fixing member in the X direction. This makes it possible to fix the armature 2 and the cylinder block 111.

Like the armature fixing bolt 8, the cylinder fixing bolt 80 may be configured to penetrate through the armature 2. It may be configured to be screwed with the insertion hole 94 of the second auxiliary magnetic pole 50. This makes it possible to fix the armature 2 and the cylinder block 111 even if the insertion hole for insertion of the cylinder fixing bolt 80 is not formed in the member other than the second auxiliary magnetic pole 50 (magnetic pole 4, first auxiliary magnetic pole 5, end bridge 6, bridge 7), which is the member at the end of the armature 2 in the Z direction. The cylinder fixing bolt 80 as a magnetic substance allows suppression of the magnetic flux leakage in the Z direction.

Preferably, the non-magnetic substance is used for forming the first fixing member and/or the second fixing member from the aspect of suppressing the magnetic flux leakage.

The use of two types of fixing members of the first and the second fixing members allows assembly of the armature 2, and then attachment of the compression element 110 to the armature 2, resulting in improved assembly workability. Various kinds of known members such as bolts and caulking pins may be used for the fixing member.

The armature fixing bolt 8 is configured to penetrate through the armature 2 so as to have both ends fastened and fixed, which allows the magnetic pole 4, the first auxiliary magnetic pole 5, the end bridge 6, the bridge 7, and the second auxiliary magnetic pole 50 to be fixed.

It is also possible to provide the armature 2 with any other members which may be disposed between the second auxiliary magnetic pole 50 and the cylinder block 111, for example. Specifically, an end frame (not shown) having a plurality of insertion holes may be provided at the outer side of the second auxiliary magnetic pole 50 in the Z direction. In the aforementioned state, the second auxiliary magnetic pole 50 does not serve as the member positioned at the end of the armature 2 in the Z direction. Accordingly, the insertion hole 94 for insertion of the cylinder fixing bolt 80 does not have to be formed. The similar effects may be obtained by fixing the armature 2 and the end frame with the armature fixing bolt 8, and fixing the cylinder block 111 and the end frame with the cylinder fixing bolt 80.

The compressor 100 according to the embodiment is formed by fixing the compression element 110 and the motor element 120, more specifically, the armature 2 and the cylinder block 111 so as to be assembled into substantially a rectangular parallelepiped shape. It is therefore possible to efficiently arrange plural units of compressors 100.

The aforementioned process provides the compressor 100 equipped with the linear motor 1. Similarly, the compressor equipped with the linear motor 11 may also be provided.

[Refrigerator 200]

A refrigerator 200 will be described as an example of the appliance equipped with the linear motor 1 or the aforementioned compressor 100.

Figure 14:
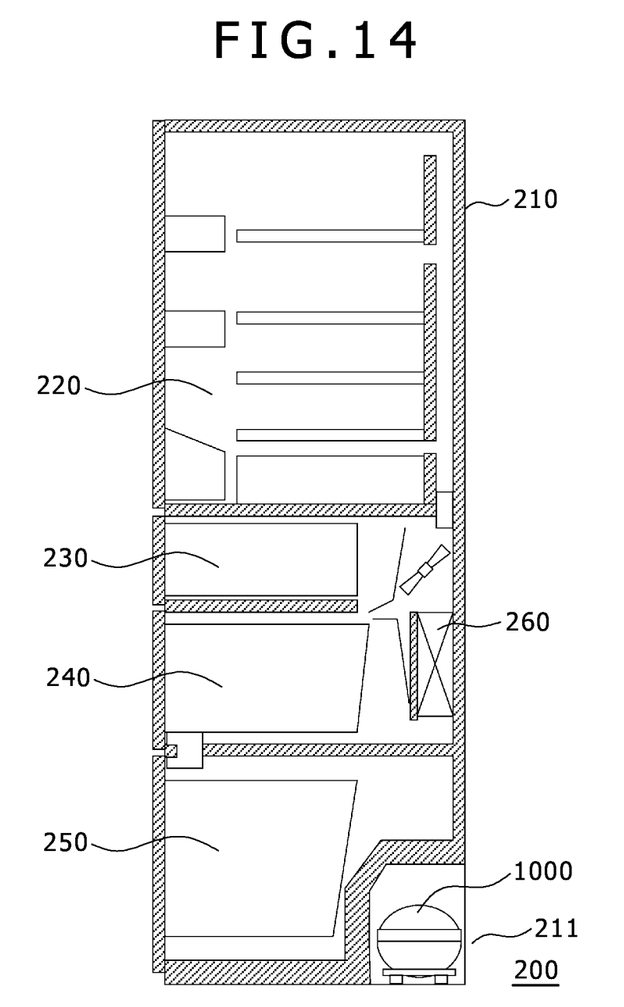
FIG. 14 is a longitudinal section of a refrigerator equipped with the linear motor.

FIG. 14 is a longitudinal sectional view of the refrigerator 200 equipped with the linear motor 1.

Referring to FIG. 14, the linear motor 1 is incorporated in a sealed type compressor 1000 equipped with the compressor 100. The refrigerator 200 includes a heat insulation casing 210. The sealed type compressor 1000 is disposed in the region defined by the heat insulation casing 210 and a partition 211. A refrigeration cycle using such refrigerant as R600a is formed by connecting the sealed type compressor 1000, a heat radiation pipe, a capillary tube, and a cooler 260.

The refrigerator 200 includes such storage compartments as a refrigerating compartment 220, an upper freezing compartment 230, a lower freezing compartment 240, and a vegetable compartment 250, each inner space of which is cooled through activation of the freezing cycle (not shown) by driving the sealed type compressor 1000.

The refrigerator 200 according to the embodiment includes the heat insulation casing 210 and the partition 211, which form substantially a rectangular parallelepiped shape. The sealed type compressor 1000 outside the heat insulation casing 210 is located to the rear of the vegetable compartment 250 (right side of the figure), which reduces storage capacity of the vegetable compartment 250. Preferably, the sealed type compressor 1000 is structured compact for the purpose of increasing capacity of the refrigerator 200. The linear motor according to the embodiment may be downsized so that the machine chamber that stores the sealed type compressor 1000 is made compact, thus increasing capacity of the vegetable compartment 250. The vegetable compartment 250 may be used as the freezing compartment 250 or the refrigerating compartment 250 by varying the set temperature zone.

The location at which the sealed type compressor 1000 is disposed is not particularly restricted. It is possible to dispose the compressor arbitrarily in the area around the heat insulation casing 210. For example, it may be disposed to the rear of or around any one of the above-described storage compartments.

[Other Device]

The device to be equipped with the linear motor 1 or 11 is not particularly restricted, which is applicable to the device for various uses such as the electric pump, the XY stage in addition to the compressor and the refrigerator. For example, for the use of refrigeration air conditioning, it is applicable to such system as the air conditioning system, and freezing/refrigerating showcase.

What is claimed is:
1. A linear motor comprising:
an armature including a first magnetic pole and a second magnetic pole arranged in a Z direction, and a first winding wire wound around the first magnetic pole, and a second winding wire wound around the second magnetic pole;
a mover with a permanent magnet, which moves relative to the armature in the Z direction;
a first auxiliary magnetic pole disposed between the first and second magnetic poles;
a first bridge disposed between the first auxiliary magnetic pole and the first magnetic pole;
a second bridge disposed between the first auxiliary magnetic pole and the second magnetic pole,
wherein the first and second winding wires are disposed on a same first side of the permanent magnet,
wherein the first and second winding wires are electrically coupled and magnetic fluxes generated in the first and second magnetic poles by currents flowing through the first and second winding wires are oppositely directed, and
a third winding wire wound around the first magnetic pole, and a fourth winding wire wound around the second magnetic pole,
wherein the third and fourth winding wires are disposed on a same second side of the permanent magnet opposite the first side,
wherein the third and fourth winding wires are electrically coupled and the magnetic fluxes generated in the first and second magnetic poles by currents flowing through the third and fourth winding wires are oppositely directed,
wherein the magnetic fluxes generated by the currents flowing through the first and third winding wires are in the same direction, and
wherein the magnetic fluxes generated by the currents flowing through the second and fourth winding wires are in the same direction.
2. The linear motor according to claim 1, wherein a conductivity and a permeability of the armature in X and Y directions are higher than a conductivity and a permeability in the Z direction.

3. The linear motor according to claim 1, wherein the first and second bridges are each a non-magnetic substance.

4. The linear motor according to claim 1,
wherein the first auxiliary magnetic pole defines a first space communicated in the Z direction on the first side of the permanent magnet, and
the first space is greater than or equal to an XY dimension of the first and second winding wires when seen from the Z direction.

5. The linear motor according to claim 4, wherein the first auxiliary magnetic pole defines a second space communicated in the Z direction on the second side of the permanent magnet, and
the second space is greater than or equal to an XY dimension of the third and fourth winding wires when seen from the Z direction.

6. The linear motor according to claim 1, wherein a second auxiliary magnetic pole is provided at an outer side of both the first magnetic pole and the second magnetic pole in the Z direction, respectively via an end bridge.

7. A compressor comprising:
a linear motor comprising:
an armature including a first magnetic pole and a second magnetic pole arranged in a Z direction, and a first winding wire wound around the first magnetic pole, and a second winding wire wound around the second magnetic pole;
a mover with a permanent magnet, which moves relative to the armature in the Z direction;
a first auxiliary magnetic pole disposed between the first and second magnetic poles;
a first bridge disposed between the first auxiliary magnetic pole and the first magnetic pole;
a second bridge disposed between the first auxiliary magnetic pole and the second magnetic pole,
wherein the first and second winding wires are disposed on a same first side of the permanent magnet,
wherein the first and second winding wires are electrically coupled and magnetic fluxes generated in the first and second magnetic poles by currents flowing through the first and second winding wires are oppositely directed, and
a third winding wire wound around the first magnetic pole, and a fourth winding wire wound around the second magnetic pole,
wherein the third and fourth winding wires are disposed on a same second side of the permanent magnet opposite the first side,
wherein the third and fourth winding wires are electrically coupled and the magnetic fluxes generated in the first and second magnetic poles by currents flowing through the third and fourth winding wires are oppositely directed,
wherein the magnetic fluxes generated by the currents flowing through the first and third winding wires are in the same direction, and
wherein the magnetic fluxes generated by the currents flowing through the second and fourth winding wires are in the same direction;
a cylinder block;
a first fixing member which is inserted into an insertion hole of the armature in the Z direction; and
a second fixing member which is inserted into insertion holes of the cylinder block and the armature in the Z direction.

8. The compressor according to claim 7, wherein the second fixing member is allowed to be screwed with an insertion hole of a member attached to an end of the armature in the Z direction.

9. The compressor according to claim 7, wherein the cylinder block and the armature are fixed to form substantially a rectangular parallelepiped shape.

10. The linear motor according to claim 7, wherein the first auxiliary magnetic pole defines a first space communicated in the Z direction on the first side of the permanent magnet, and
the first space is greater than or equal to an XY dimension of the first and second winding wires when seen from the Z direction.

11. The linear motor according to claim 10, wherein the first auxiliary magnetic pole defines a second space communicated in the Z direction on the second side of the permanent magnet, and
the second space is greater than or equal to an XY dimension of the third and fourth winding wires when seen from the Z direction.

* * * * *